United States Patent
Jia et al.

(10) Patent No.: US 10,740,245 B2
(45) Date of Patent: Aug. 11, 2020

(54) METHOD, DEVICE AND COMPUTER PROGRAM PRODUCT FOR CACHE MANAGEMENT

(71) Applicant: EMC IP Holding Company LLC, Hopkinton, MA (US)

(72) Inventors: Ruiyong Jia, Beijing (CN); Xinlei Xu, Beijing (CN); Lifeng Yang, Beijing (CN); Liam Xiongcheng Li, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/173,086

(22) Filed: Oct. 29, 2018

(65) Prior Publication Data
US 2019/0129859 A1    May 2, 2019

(30) Foreign Application Priority Data

Oct. 27, 2017  (CN) .......................... 2017 1 1022190

(51) Int. Cl.
| G06F 12/00 | (2006.01) |
|---|---|
| G06F 12/0891 | (2016.01) |
| G06F 12/0808 | (2016.01) |
| G06F 12/0882 | (2016.01) |
| G06F 12/0871 | (2016.01) |
| G06F 12/0868 | (2016.01) |
| G06F 12/123 | (2016.01) |

(52) U.S. Cl.
CPC ...... *G06F 12/0891* (2013.01); *G06F 12/0808* (2013.01); *G06F 12/0868* (2013.01); *G06F 12/0871* (2013.01); *G06F 12/0882* (2013.01); *G06F 12/123* (2013.01); *G06F 2212/1016* (2013.01)

(58) Field of Classification Search
CPC .................................................. G06F 12/0891
See application file for complete search history.

(56) References Cited

U.S. PATENT DOCUMENTS

| 5,586,290 | A | 12/1996 | Hirai et al. | |
|---|---|---|---|---|
| 9,158,706 | B2 | 10/2015 | Benhase et al. | |
| 9,292,228 | B2* | 3/2016 | Baderdinni | G06F 3/0689 |
| 10,157,133 | B2* | 12/2018 | Jalal | G06F 12/0815 |
| 10,203,906 | B2* | 2/2019 | Li | G06F 11/1441 |
| 2003/0159001 | A1* | 8/2003 | Chalmer | G06F 3/0601 |
| | | | | 711/120 |
| 2012/0179874 | A1* | 7/2012 | Chang | G06F 9/45558 |
| | | | | 711/128 |
| 2016/0266844 | A1 | 9/2016 | Ogawa | |
| 2018/0089088 | A1* | 3/2018 | Jakowski | G06F 12/0607 |

\* cited by examiner

*Primary Examiner* — Tammara R Peyton
(74) *Attorney, Agent, or Firm* — BainwoodHuang

(57) ABSTRACT

Embodiments of the present disclosure provide a method, device and computer program product for cache management. The method includes: receiving from a storage device an indication for an invalid storage block in the storage device; in response to receiving the indication, looking up a cache page associated with the invalid storage block in the cache; in response to finding the cache page in the cache, determining validity of data in the cache page; and in response to the data being invalid, reclaiming the cache page.

20 Claims, 7 Drawing Sheets

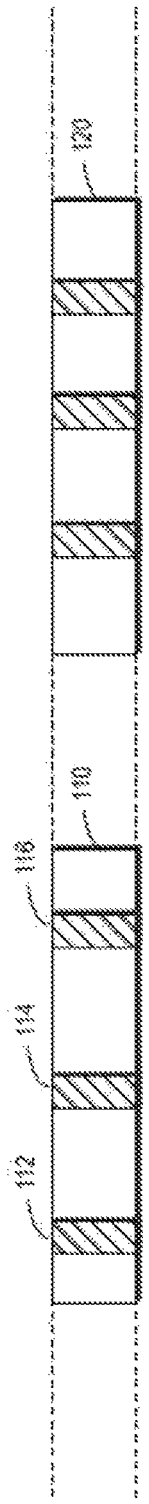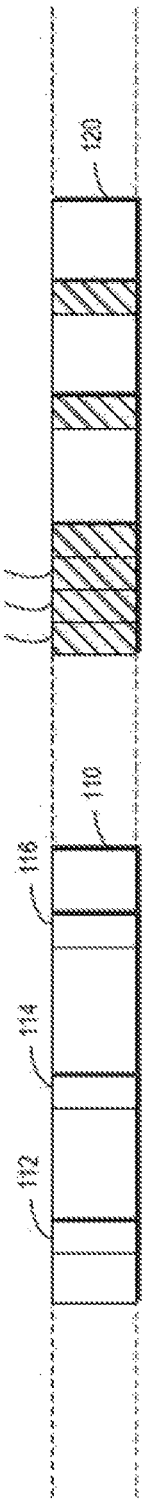

METHOD, DEVICE AND COMPUTER PROGRAM PRODUCT FOR CACHE MANAGEMENT

RELATED APPLICATIONS

This application claim priority from Chinese Patent Application Number CN 201711022190.7, filed on Oct. 27, 2017 at the State Intellectual Property Office, China, titled "METHOD, DEVICE AND COMPUTER PROGRAM PRODUCT FOR MANAGING CACHE" the contents of which is herein incorporated by reference in its entirety.

FIELD

The present disclosure generally relates to the field of storage management, and more specifically, the present disclosure relates to a method, device and computer program product for cache management.

BACKGROUND

With development of the data storage technologies, various data storage devices are capable of providing a more powerful data storage capability to a user, and the data access speed is significantly improved. As the data storage capability is improved, the user puts forward higher requirements on the data reliability and response time of the storage system.

Nowadays, there has been developed a technical solution of creating a storage system based on multiple levels of storage media having different access speeds. For example, frequently used data are loaded from a storage device having a lower access speed to a cache device having a higher access speed. Further, the cache is used to respond to an access request from outside of the storage system. The technical solution may improve the data response efficiency to a certain degree. However, the conventional solutions are generally impaired by the problem of being unable to reclaim the cache pages corresponding to the invalid data in the disk.

SUMMARY

Embodiments of the present disclosure provide a solution of cache management.

In accordance with a first aspect of the present disclosure, there is provided a method for cache management. The method comprises: receiving an indication for an invalid storage block in the storage device, from a storage device; in response to receiving the indication, looking up a cache page associated with the invalid storage block in the cache; in response to finding the cache page in the cache, determining validity of data in the cache page; and in response to the data being invalid, reclaiming the cache page.

In accordance with a second aspect of the present disclosure, there is provided a device for cache management. The device comprises: at least one processing unit; and at least one memory coupled to the at least one processing unit and storing instructions executed by the at least one processing unit, the instructions, when executed by the at least one processing unit, causing the device to perform acts comprising: receiving an indication for an invalid storage block in the storage device, from a storage device; in response to receiving the indication, looking up a cache page associated with the invalid storage block in the cache; in response to finding the cache page in the cache, determining validity of data in the cache page; and in response to the data being invalid, reclaiming the cache page.

In accordance with a third aspect of the present disclosure, there is provided a computer program product. The computer program product is stored on a non-transient computer storage medium and comprises machine-executable instructions which, when operating in a device, cause the device to execute the method in accordance with the first aspect.

This Summary is provided to introduce a selection of concepts in a simplified form that are further described below in the Detailed Description. This Summary is not intended to identify key features or essential features of the claimed subject matter, nor is it intended to be used to limit the scope of the present disclosure.

BRIEF DESCRIPTION OF THE DRAWINGS

The above and other objectives, features, and advantages of example embodiments of the present disclosure will become more apparent, through the detailed description on example embodiments of the present disclosure with reference to the accompanying drawings, in which the identical reference symbols generally represent the identical components.

FIGS. 1A-1C illustrate schematic diagrams of hard disk defragmentation;

DETAILED DESCRIPTION OF EMBODIMENTS

Figure 2:
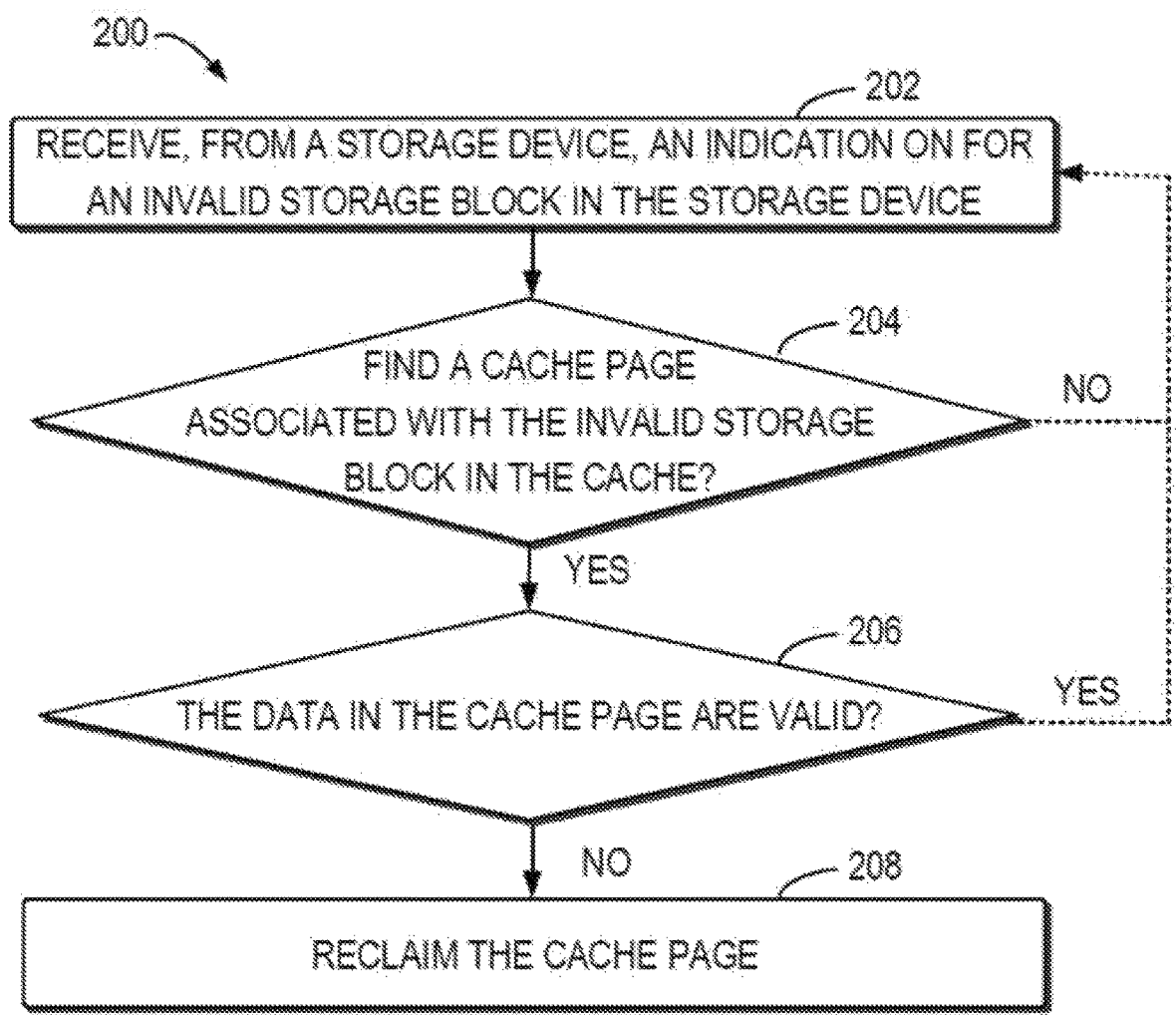
FIG. 2 illustrates a flowchart of a method for cache management according to embodiments of the present disclosure.

Preferred embodiments of the present disclosure will be described in more detail with reference to the drawings. Although the drawings illustrate preferred embodiments of the present disclosure, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" or the like can represent different or the same objects. Other definitions, either explicit or implicit, may be included below.

In some disk processing procedures (for example, disk defragmentation, threshold logic unit shrink, replica destruction, data deduplication and the like), data in particular storage blocks in the disk may become invalid. For ease of description, the disk defragmentation will be provided in this context as an example for describing invalidity of the data in storage blocks of a disk. Specifically, referring to FIGS. 1A to 1C, FIGS. 1A to 1C illustrate schematic diagrams of hard disk defragmentation.

As shown in FIG. 1A, there are two storage slices 110 and 120 in a disk, and the storage slice 110 comprises three discontinuous storage blocks 112, 114 and 116. In a process of disk defragmentation, a system may determine to move the discontinuous storage blocks 112, 114 and 116 in the storage slice 110 to the storage slice 120, such that a continuous free storage space may be formed in the storage slice 110. Referring to FIG. 1B, in the process of disk defragmentation, the system moves the storage blocks 112, 114 and 116 in the storage slice 110 to the storage slice 120, forming storage locks 122, 124 and 126. As shown in FIG. 1C, data of the storage blocks 112, 114 and 116 in the storage slice 110 become invalid after movement of the storage blocks is completed.

The inventors notice that the conventional cache management does not take into account whether disk data corresponding to cache pages is already invalid, but only relies on an LRU (Least Recently Used) algorithm to determine the cache pages to be reclaimed. In this mechanism, some cache pages associated with invalid backend data are still retained, while some cache pages associated with the valid backend data may be reclaimed, which affects the hit ratio of cache.

Embodiments of the present disclosure provide a solution of cache management. In this solution, when data of a storage block in the disk becomes invalid, the disk notifies a cache management system of this message, and the cache management system will build a list of cache pages corresponding to invalid storage blocks. In a process of cache page reclaiming, the system reclaims preferentially the cache pages in the list, such that more valid data can be retained in the cache, thereby increasing the hit ratio of cache and improving read performance of the system.

In addition, such cache management mechanism is also helpful to avoid flushing invalid dirty data to the disk and further to reduce disk bandwidth to be used during flushing, and it can also increase the cache flushing speed and thus improve write performance of the system.

FIG. 2 illustrates a flowchart of a method 200 for cache management according to embodiments of the present disclosure. Acts involved in the method 200 will be described below with reference to the process of disk defragmentation as shown in FIG. 1.

At block 202, the cache management system receives from a storage device an indication for an invalid storage block in the storage device. Specifically, the disk defragmentation as shown in FIG. 1 is provided as an example. After the storage device determines that the data in the storage blocks 112, 114 and 116 is invalid, the storage device may send to the cache management system an indication that the data in the storage blocks 112, 114 and 116 are invalid. In some embodiments, each storage block, for example, may be 8 Kb in size (note that the specific value is only provided as an example), and the indication may be described as a triple <LUN ID, start LBA, last access time t1>. The LUN ID denotes a logic unit number of a storage block, the start LBA denotes a start logic block address of the storage block, and the last access time t1 denotes a time when the storage block in the storage device is last accessed.

Figure 3:
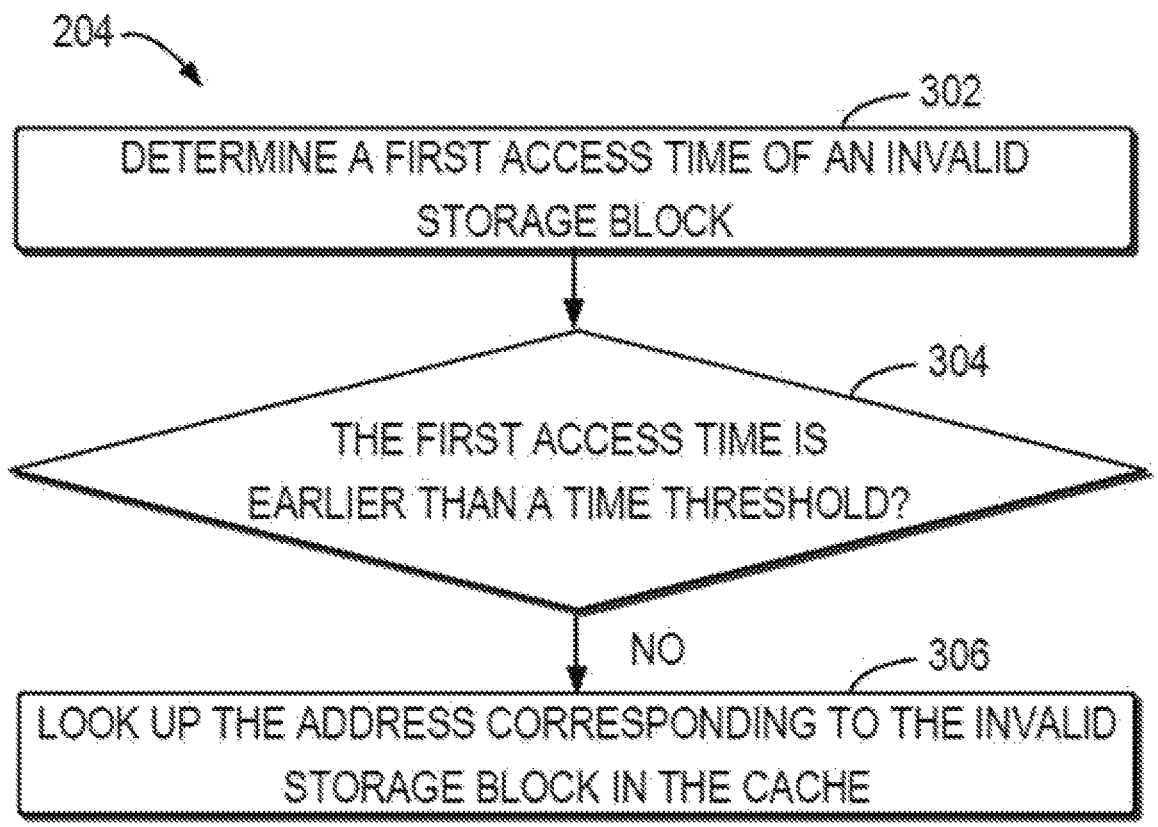
FIG. 3 illustrates a flowchart of a process of searching a cache page associated with an invalid storage block in a cache according to embodiments of the present disclosure.

At block 204, in response to receiving the indication, the cache management system looks up a cache page associated with the invalid storage block in the cache. The process involved at block 204 will be described below in detail with reference to FIG. 3.

In response to receiving the indication, at block 302, the cache management system determines a first access time of an invalid storage block. As described above, the cache management system may receive from the storage device the indication for the invalid storage block, namely the triple <LUN ID, start LBA, last access time t1>, and the last access time t1 is the first access time of the invalid storage block.

At block 304, the cache management system determines whether the first access time is earlier than a time threshold t, wherein the time threshold t indicates a time when the oldest page in the cache was updated. If t1 is earlier than the time threshold t, it is indicated that the data block is even earlier than the oddest page in the cache, and it can be determined that the data block does not exist in the cache, and no further processing is needed accordingly. Based on comparison of t1 with the time threshold t, the cache management system can rapidly neglect storage blocks which are obviously absent from the cache, thereby improving the efficiency of looking up the cache pages.

By contrast, if t1 is later than the time threshold t, it is indicated that the update time of the storage block is later than or equal to the update time of the oldest cache page in the cache. Therefore, the data block may exist in the cache, and the cache management system looks up the address corresponding to the invalid storage block in the cache, at block 306. In some embodiments, the cache management system may look up the cache page corresponding to the invalid data block in a cache page index list using the LUN ID and the start LBA in the triple as a search entry, wherein the cache page index list stores association between the storage blocks in the storage device and the cache pages.

Figure 4:
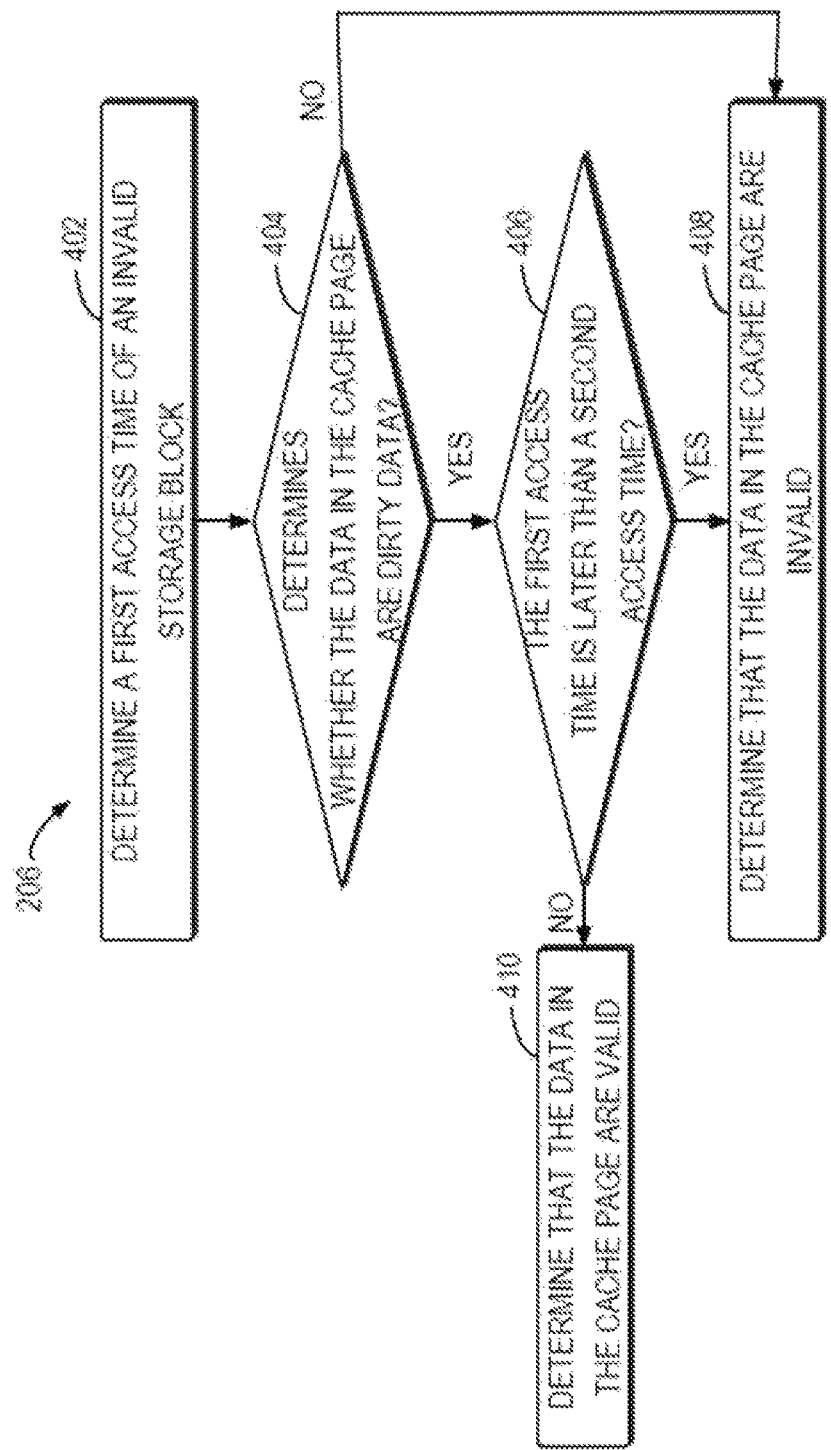
FIG. 4 illustrates a flowchart of a process of determining whether data in a cache page are valid according to embodiments of the present disclosure.

Still referring to FIG. 2, if the cache page associated with the invalid storage block is found at block 204, the cache management system determines validity of the data in the cache page in response to finding the cache page in the cache, at block 206. Otherwise, at block 202, the cache management system continues to perform determination of an indication on a next invalid storage block. Specific steps involved at block 206 will be described below in detail with reference to FIG. 4.

At block 402, the cache management system determines a first access time of an invalid storage block. This step may be performed similarly as the determining process as described with reference to block 302, and it will not be described herein in detail for the purpose of brevity.

In some embodiments, in response to obtaining the cache page in the cache, the cache management system may also store the indication for the invalid data block into an invalid data list, which is maintained in a processor core where the cache page is located. Specifically, FIG. 5 illustrates a schematic diagram of architecture 500 for managing cache according to embodiments of the present disclosure.

Figure 5:
FIG. 5 illustrates a schematic diagram of architecture of cache management according to embodiments of the present disclosure.

As shown in FIG. 5, the architecture 500 includes four processor cores 520, 540, 560 and 580, and the processor core 520 provided as an example includes three different cache page reclaiming stacks 522, 524 and 526. The cache page reclaiming stacks 522, 524 and 526 are associated with different weights respectively, and the cache pages in the page reclaiming stack with a low weight are reclaimed preferentially. For example, in this example, the cache page reclaiming stack 522 has the lowest weight, and the cache page reclaiming stack 526 has the highest weight. Accordingly, the cache pages in the cache page reclaiming stack 522 are reclaimed preferentially.

Moreover, each cache page reclaiming stack has three LRU lists. For example, the cache page reclaiming stack 522 has a clean LRU list 528, a dirty LRU list 530 and a flushing LRU list 532. The clean LRU list 528 stores clean cache pages, the dirty LRU list 530 stores dirty cache pages, and the flushing LRU list 532 stores the cache pages being flushed.

In the example, in response to the cache pages being located in the processor core 520, the cache management system may store the indication for the invalid storage block received from the storage device into the invalid data list 534 in the processor core 520.

Returning to FIG. 4, at block 404, the cache management system determines whether the data in the cache page are dirty data. If the data in the cache page are clean data, the cache management system determines, at block 408, that the data in the cache page are invalid. Otherwise, at block 406, the cache management system determines whether the first access time is later than second access time. The second access time indicates a last access time t2 of the cache page in the cache.

If it is determined at block 406 that t1 is later than t2, it is demonstrated that no rewriting occurs in the cache after the data in the data block became invalid in the storage device. At this time, it is determined, at block 408, that the data in the cache page is already invalid.

On the other hand, if it is determined at block 406 that t1 is earlier than or equal to t2, it is demonstrated that rewriting into the data block occurs in the cache after the data in the data block become invalid in the storage device. At this time, it is determined, at block 410, that the data in the cache page are valid. Through comparison between t1 and t2, the cache management system may effectively avoid reclaiming rewritten cache pages after the data in the storage block become invalid.

Continuing to refer to FIG. 2, if it is determined at block 206 that the data in the cache page are invalid, in response to determining that the data in the cache page are invalid, the cache system reclaims, at block 208, the cache page for a new write request. Otherwise, at block 202, the cache management system continues to perform determination of an indication for a next invalid storage block.

The method for cache management according to embodiments of the present disclosure is described above with reference to FIGS. 2-5. Based on the method, the cache management system may utilize effectively an indication that the storage block is invalid in the storage device, so as to reclaim preferentially the cache page determined to be invalid. In this process, the cache management system further avoids mistaken reclaiming of rewritten cache pages after the data in the storage block become invalid.

Figure 6:
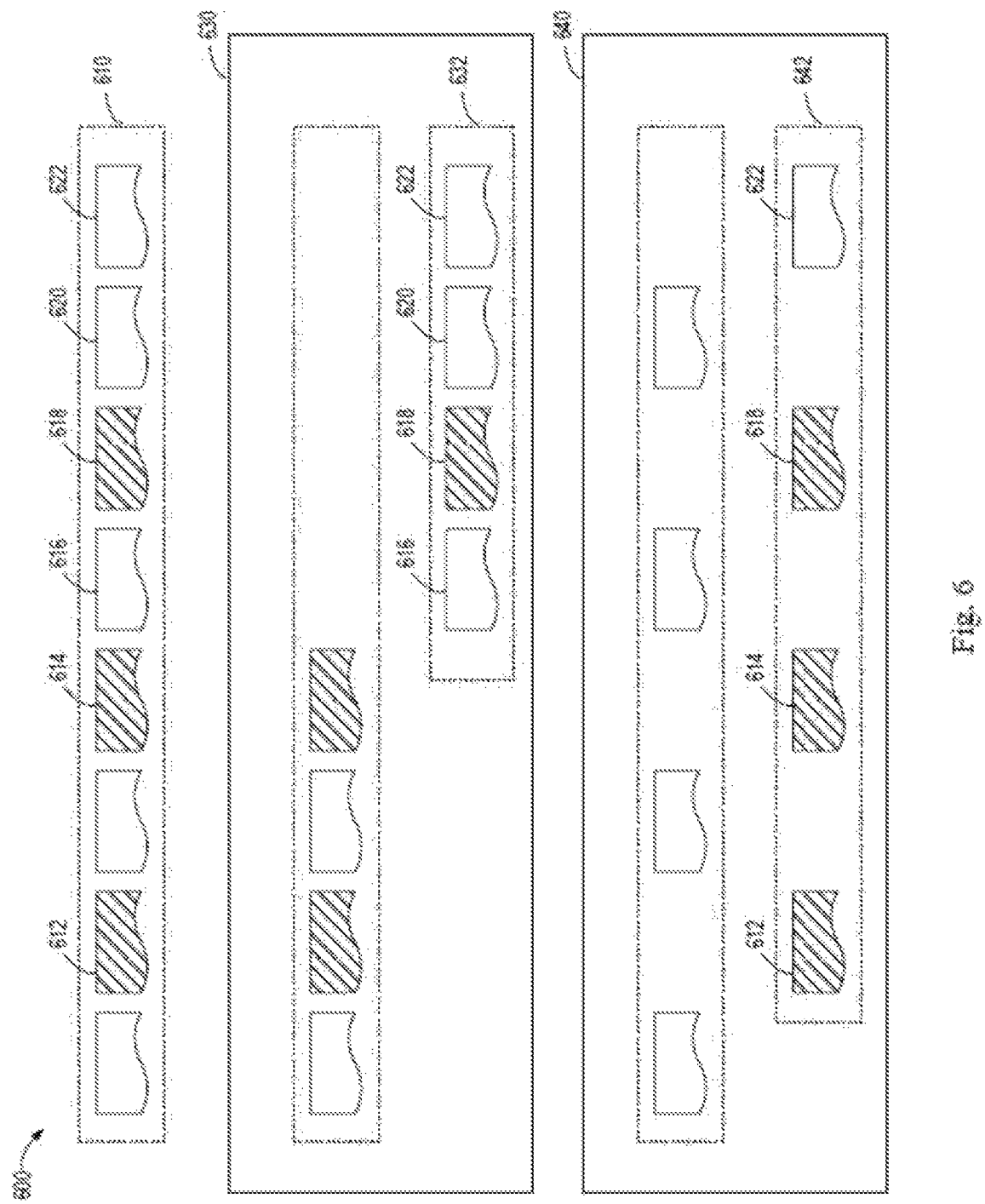
FIG. 6 illustrates a contrastive schematic diagram of cache reclaiming according to embodiments of the present disclosure.

FIG. 6 illustrates a comparison diagram 600 of cache reclaiming according to embodiments of the present disclosure. FIG. 6 shows an LRU list 602 to be reclaimed in the cache, wherein short slashes represent cache pages determined as storing invalid data. As shown in FIG. 6, the cache pages determined as storing invalid data include cache pages 612, 614 and 618. In the example, the caching requires reclaiming 4 cache pages. According to the conventional cache reclaiming process 630, the cache management system reclaims the oldest 4 cache pages sequentially following the order of the LRU list, i.e., the reclaimed cache pages 632 include cache pages 616, 618, 620 and 622, among which only the cache page 618 stores invalid data.

In a cache reclaiming process 640 according to the present disclosure, the cache management system reclaims preferentially the cache page storing invalid data, and then performs conventional reclaiming according to the sequence of the LRU list 610. Therefore, the reclaimed cache pages 642 include cache pages 612, 614, 618 and 622. Wherein, there are three cache pages 612, 614 and 618 storing invalid data. As compared to the conventional cache reclaiming process 630, the cache reclaiming procedure 640 according to the present disclosure may preserve the cache pages storing valid data for a longer time, thereby increasing the hit ratio of cache and further improving the read efficiency of the system. On the other hand, the cache reclaiming process 640 is also helpful to avoid flushing invalid dirty data to the disk, thus reducing disk bandwidth as required during flushing, and this can further increase the cache flushing rate and improve the write performance of the system.

Figure 7:
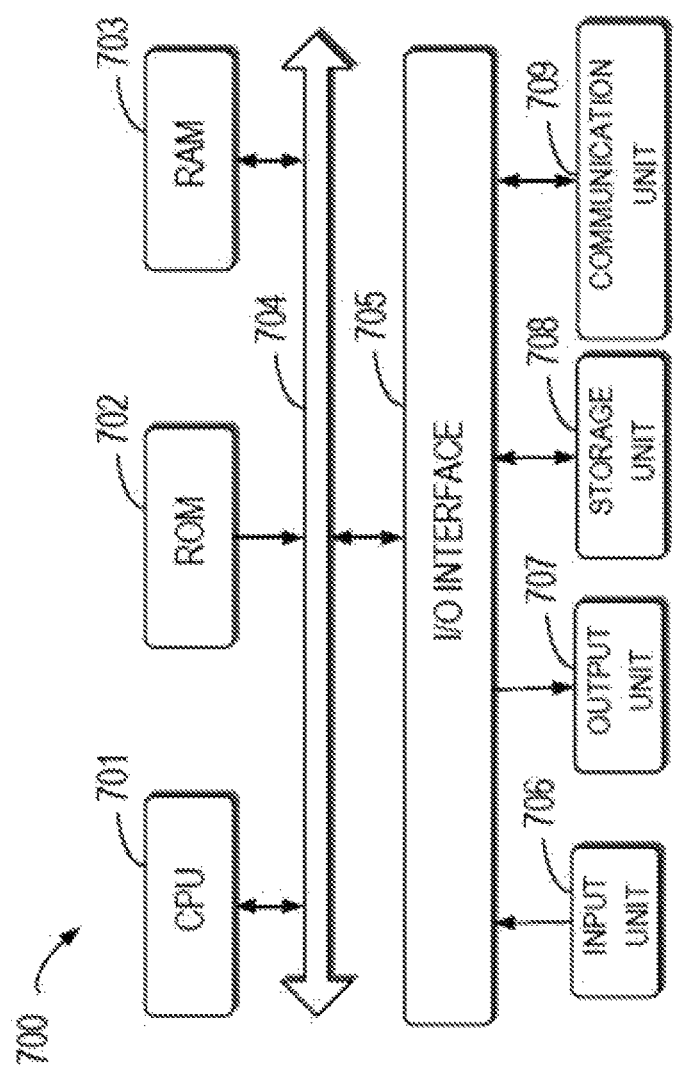
FIG. 7 illustrates a schematic diagram of an example device that can be used to implement embodiments of the present disclosure.

FIG. 7 is a schematic block diagram of an example apparatus that can be used to implement embodiments of the present disclosure. As shown in FIG. 7, the apparatus 700 comprises a central processing unit (CPU) 701 which is capable of performing various processes in accordance with computer program instructions stored in a read only memory (ROM) 702 or computer program instructions loaded from a storage unit 708 to a random access memory (RAM) 703. In the RAM 703 are stored various programs and data as required by operation of the apparatus 700. The CPU 701, the ROM 702 and the RAM 703 are connected to one another via a bus 704. An input/output (I/O) interface 706 is also connected to the bus 704.

The following components in the device 700 are connected to the I/O interface 705: an input unit 706 including a keyboard, a mouse, or the like; an output unit 707 such as various types of displays and speakers; the storage unit 708 such as a magnetic disk or optical disk; and a communication unit 709 such as a network card, a modem, a wireless communication transceiver or the like. The communication unit 709 allows the device 700 to exchange information/data with other devices through a computer network such as the Internet and/or various types of telecommunication networks.

The processing unit 701 performs various method and processes described above, for example methods 200. For example, in some embodiments, the method 300 may be implemented as a computer software program or computer program product, which is tangibly contained in a machine-readable medium, for example the storage unit 708. In some embodiments, part or all of the computer program may be loaded and/or installed on the device 700 via ROM 702 and/or communication unit 709. When the computer program is loaded in the RAM 703 and executed by CPU 701, one or more acts of the method 200 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A method for cache management, comprising:
receiving from a storage device an indication for an invalid storage block in the storage device;

in response to receiving the indication, looking up a cache page associated with the invalid storage block in the cache;

in response to finding the cache page in the cache, determining validity of data in the cache page; and in response to the data being invalid, reclaiming the cache page.

2. The method of claim 1, wherein the indication further comprises a first access time of the invalid storage block, and looking up the cache page associated with the invalid storage block in the cache comprises:

determining whether the first access time is later than or equal to a time threshold, the time threshold indicating a time when an oldest cache page in the cache is updated; and in response to the first access time being later than or equal to the time threshold, looking up an address corresponding to the invalid storage block in the cache.

3. The method of claim 1, wherein the indication further comprises a first access time of the invalid storage data, and determining the validity of the data in the cache page comprises:

determining whether the data stored in the cache page are marked as dirty data;

in response to the data being marked as dirty data, determining whether the first access time is later than a second access time of the cache page; and in response to the first access time being later than the second access time, determining that the data are invalid.

4. The method of claim 3, wherein determining the validity of the data in the cache page further comprises:

in response to the data in the cache page being clean data, determining that the data are invalid.

5. The method of claim 2, wherein looking up the address corresponding to the invalid storage block comprises:

determining, from the indication, a logic unit identifier and a start address of the invalid storage block; and looking up the address corresponding to the invalid storage block in the cache based on the logic unit identifier and the start address of the invalid storage block.

6. A device for cache management, comprising:

at least one processing unit; and at least one memory coupled to the at least one processing unit and storing instructions executed by the at least one processing unit, the instructions, when executed by the at least one processing unit, causing the device to perform acts comprising:

receiving from a storage device an indication for an invalid storage block in the storage device;

in response to receiving the indication, looking up a cache page associated with the invalid storage block in the cache;

in response to finding the cache page in the cache, determining validity of data in the cache page; and in response to the data being invalid, reclaiming the cache page.

7. The device of claim 6, wherein the indication further comprises a first access time of the invalid storage block, and looking up the cache page associated with the invalid storage block in the cache comprises:

determining whether the first access time is later than or equal to a time threshold, the time threshold indicating a time when an oldest cache page in the cache is updated; and in response to the first access time being later than or equal to the time threshold, looking up an address corresponding to the invalid storage block in the cache.

8. The device of claim 6, wherein the indication further comprises a first access time of the invalid storage data, and determining the validity of the data in the cache page comprises:

determining whether the data stored in the cache page are marked as dirty data;

in response to the data being marked as dirty data, determining whether the first access time is later than a second access time of the cache page; and in response to the first access time being later than the second access time, determining that the data are invalid.

9. The device of claim 7, wherein determining the validity of the data in the cache page further comprises:

in response to the data in the cache page being clean data, determining that the data are invalid.

10. The device of claim 8, wherein looking up the address corresponding to the invalid storage block comprises:

determining, from the indication, a logic unit identifier and a start address of the invalid storage block; and looking up the address corresponding to the invalid storage block in the cache based on the logic unit identifier and the start address of the invalid storage block.

11. A computer program product being stored on a non-transient computer storage medium and comprising machine-executable instructions which, when operating in a device, cause the device to perform acts comprising:

receiving from a storage device an indication for an invalid storage block in the storage device;

in response to receiving the indication, looking up a cache page associated with the invalid storage block in the cache;

in response to finding the cache page in the cache, determining validity of data in the cache page; and in response to the data being invalid, reclaiming the cache page.

12. The computer program product of claim 11, wherein the indication further comprises a first access time of the invalid storage block, and looking up the cache page associated with the invalid storage block in the cache comprises:

determining whether the first access time is later than or equal to a time threshold, the time threshold indicating a time when an oldest cache page in the cache is updated; and in response to the first access time is later than or equal to the time threshold, looking up an address corresponding to the invalid storage block in the cache.

13. The computer program product of claim 11, wherein the indication further comprises a first access time of the invalid storage data, and determining the validity of the data in the cache page comprises:

determining whether the data stored in the cache page are marked as dirty data;

in response to the data being marked as dirty data, determining whether the first access time is later than a second access time of the cache page; and in response to the first access time being later than the second access time, determining that the data are invalid.

14. The computer program product of claim 13, wherein determining the validity of the data in the cache page further comprises:
   in response to the data in the cache page being clean data, determining that the data are invalid.

15. The computer program product of claim 12, wherein looking up the address corresponding to the invalid storage block comprises:
   determining, from the indication, a logic unit identifier and a start address of the invalid storage block; and
   looking up the address corresponding to the invalid storage block in the cache based on the logic unit identifier and the start address of the invalid storage block.

16. The method of claim 1, wherein reclaiming the cache page includes adding the cache page to a list of invalid cache pages to be reclaimed in a reclaiming operation, and later performing the reclaiming operation to reclaim cache pages in the list of invalid cache pages.

17. The method of claim 16, wherein the reclaiming operation preferentially reclaims cache pages in the list of invalid cache pages and secondarily reclaims cache pages that are least recently used, such that for a given reclaiming operation one or more cache pages that are not least recently used but are invalid are preferentially reclaimed over other cache pages that are least recently used but are valid.

18. The method of claim 1, wherein the indication for the invalid storage block is generated by a disk processing procedure that has invalidated the storage block on the storage device separate from the cache management, and is sent from the disk processing procedure to the cache management in order to perform the steps of claim 1 to reclaim the cache page associated with the invalid storage block.

19. The method of claim 18, wherein the disk processing procedure includes one or more of disk defragmentation, logical unit shrinking, replica destruction, and data deduplication.

20. The method of claim 19, wherein the invalid storage block has become invalid by the disk processing procedure moving the data of a valid storage block to another storage block in order to free the invalid storage block for reclaiming.

* * * * *